Dec. 10, 1940.   H. SCHMEISSER   2,224,524
STRIKER COUPLING FOR SELF-LOADING WEAPONS
Filed March 8, 1938
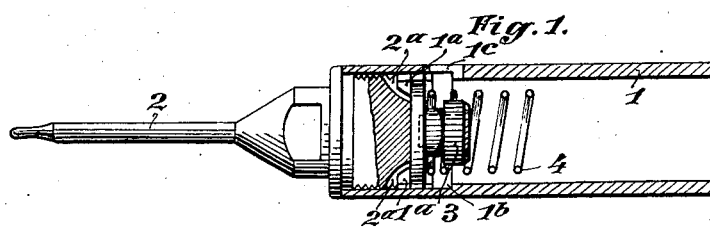
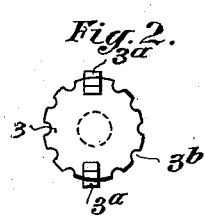
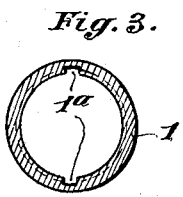
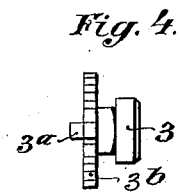
Inventor:
Hugo Schmeisser
By Young Emery & Thompson
Attorneys Patented Dec. 10, 1940

2,224,524

UNITED STATES PATENT OFFICE 2,224,524

STRIKER COUPLING FOR SELF-LOADING WEAPONS

Hugo Schmeisser, Suhl, Thuringia, Germany

Application March 8, 1938, Serial No. 194,646
In Germany March 12, 1937

3 Claims. (Cl. 42—1)

This invention relates to a striker coupling for self-loading weapons, and has for its object to couple the striker with the striker support by extremely simple means.

As compared with the previously known embodiments of striker couplings of this character the arrangement according to the invention possesses the advantage that when replacing the actual striker support, the striker can be readily removed without the necessity for tools of any kind. The striker coupling according to the invention also possesses in comparison with the previously existing arrangements the advantage that it is simple to manipulate and produce.

According to the invention, the striker, which is mounted on a tubular support by means of a thread or by grooves and recesses, is secured against accidental release by means of a locking disk, which is shiftable in the support and is acted upon by a spring, and prevents undesirable rotation and consequent release of the striker.

An embodiment of the striker coupling according to the invention is illustrated by way of example in the accompanying drawing, in which—

Fig. 1 is an elevational view of the striker with the striker support in longitudinal section.

Fig. 2 is a view of the locking disk from the front.

Fig. 3 is a cross-section through the striker support, and

Fig. 4 is an elevational view of the locking disk.

The striker 2 is secured in the support 1, either by means of a thread or by recesses or grooves. The support 1 possesses oppositely disposed longitudinal grooves 1a, which open out into an annular groove 1b. In the annular groove 1b there is mounted so as to be longitudinally shiftable a locking disk 3, which is furnished on the side directed towards the striker with two projections 3a adapted to engage in the grooves 1a in the support and in corresponding grooves 2a in the striker.

So long as the spring 4 acting against the locking disk 3 presses the projections 3a on the latter into the grooves 1a of the support 1 and the grooves 2a of the striker 2, the latter is unable to perform a rotary movement on the support, and the striker and the support are accordingly firmly coupled together.

To release the striker from the support the locking disk 3, by means of a pointed article introduced into the slot 1c in the support 1, is pressed back to such extent in the direction of the annular groove 1a that the projections 3a move out of engagement with the grooves 1a and 2a. In this position of the locking disk the striker can be readily unscrewed or otherwise removed from the support.

To be able by means of a pointed article again to move the locking disk 3 into the proper position with relation to the grooves 1a and 2a after the striker has again been fitted in the support, the locking disk 3 is provided on its periphery with recesses 3b.

What I claim as new and desire to secure by Letters Patent is:

1. In a striker coupling for self-loading weapons, a tubular support, a striker mounted on the said support, a locking disk slidable in the said support, in the longitudinal direction of the support and striker and also capable of turning therein, projections on the said disk adapted to engage in grooves in the said support and the said striker to secure the said striker against rotation relatively to the said support, and a spring for holding the said projections in engagement with the said grooves.

2. A striker coupling according to claim 1, in which the spring is the actuating spring of the striker.

3. In a striker coupling for self-loading weapons, a tubular support, a striker secured in said support, a locking disc centrally mounted in the support and slidable in the support in the longitudinal direction, said disc having means securing said striker against rotation relative to the support, and means operative in the longitudinal direction of the striker for holding the disc in operative engagement with the support and the striker.

HUGO SCHMEISSER.